United States Patent [19]
Renoux

[11] 3,752,620
[45] Aug. 14, 1973

[54] APPARATUS FOR PRESSING OBJECTS OUT OF THERMOPLASTIC MATERIAL, AND PARTICULARLY PHONOGRAPHIC DISKS

[76] Inventor: Robert A. Renoux, Les Cles de la Foret, 80, avenue, Lefebvre Poissy, France

[22] Filed: Oct. 18, 1971

[21] Appl. No.: 189,965

[52] U.S. Cl............... 425/174.2, 425/354, 425/385, 425/408, 425/424
[51] Int. Cl............................ B29c 3/06, B06b 3/00
[58] Field of Search................. 425/174, 174.2, 354, 425/363, 408, 424, 456, 385, 407, 470, DIG. 35

[56] References Cited
UNITED STATES PATENTS

| | | |
|---|---|---|
| 2,407,168 | 9/1946 | Lindkwist.................... 425/456 UX |
| 3,166,617 | 1/1965 | Munk............................. 425/424 X |
| 3,456,295 | 7/1969 | Torigai et al. ............... 425/174.2 X |
| 2,622,301 | 12/1952 | Argarden............................ 425/424 |
| 3,178,792 | 4/1965 | Scott............................. 425/407 X |
| 3,635,622 | 1/1972 | Wecksler....................... 425/408 X |

Primary Examiner—Robert L. Spicer, Jr.
Attorney—Woodhams, Blanchard & Flynn

[57] ABSTRACT

A press frame supports upper and lower plates having opposed surfaces with a pattern on each. The upper plate is secured to an ultrasonic vibration means, upward movement of which is resisted by resiliently flexible means. The lower plate is connected to a pressure fluid actuated device for urging, at a low or a high pressure, the lower plate against the upper plate when a plastic material is therebetween, thereby forming an impression in said material.

8 Claims, 3 Drawing Figures

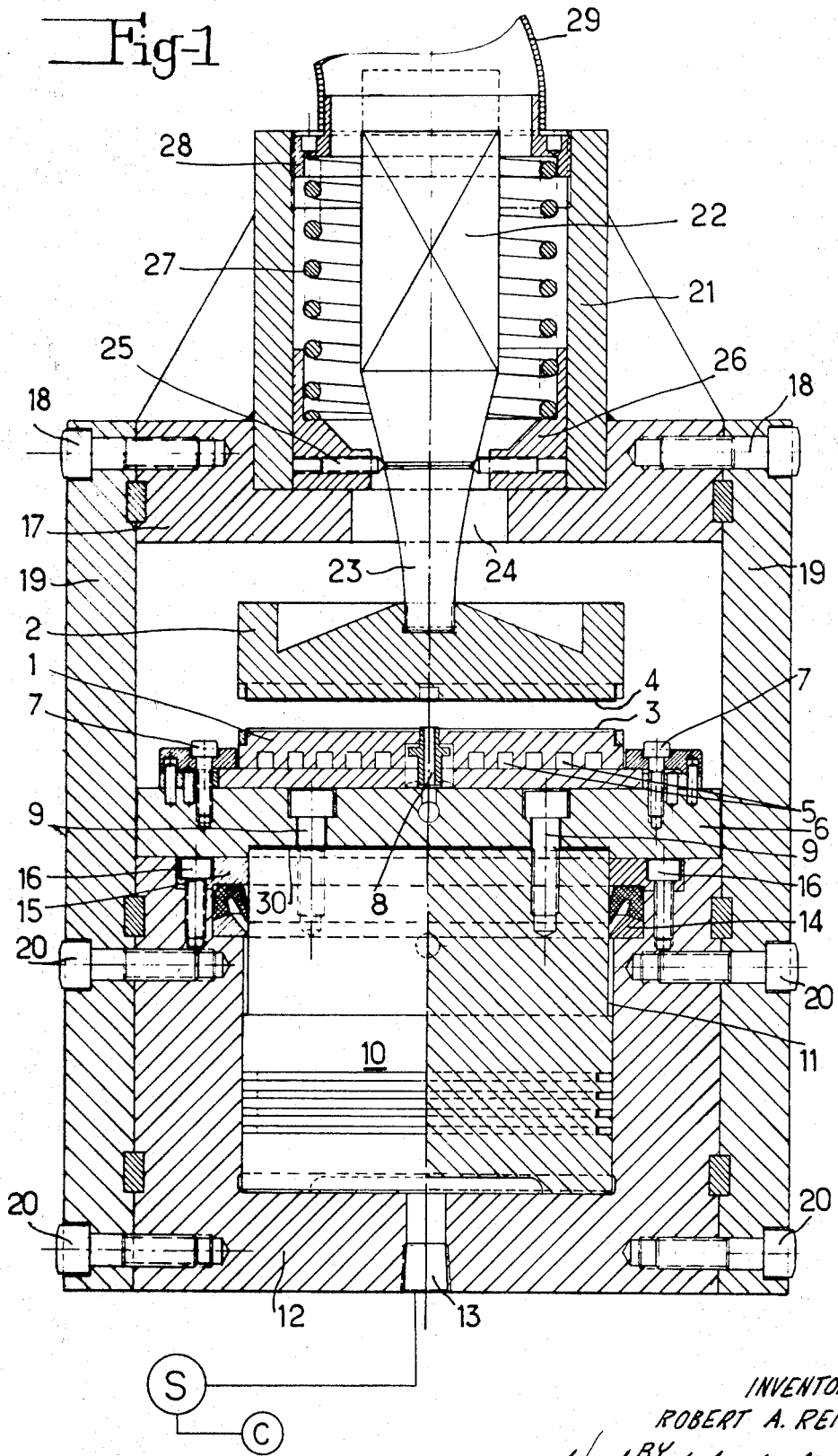

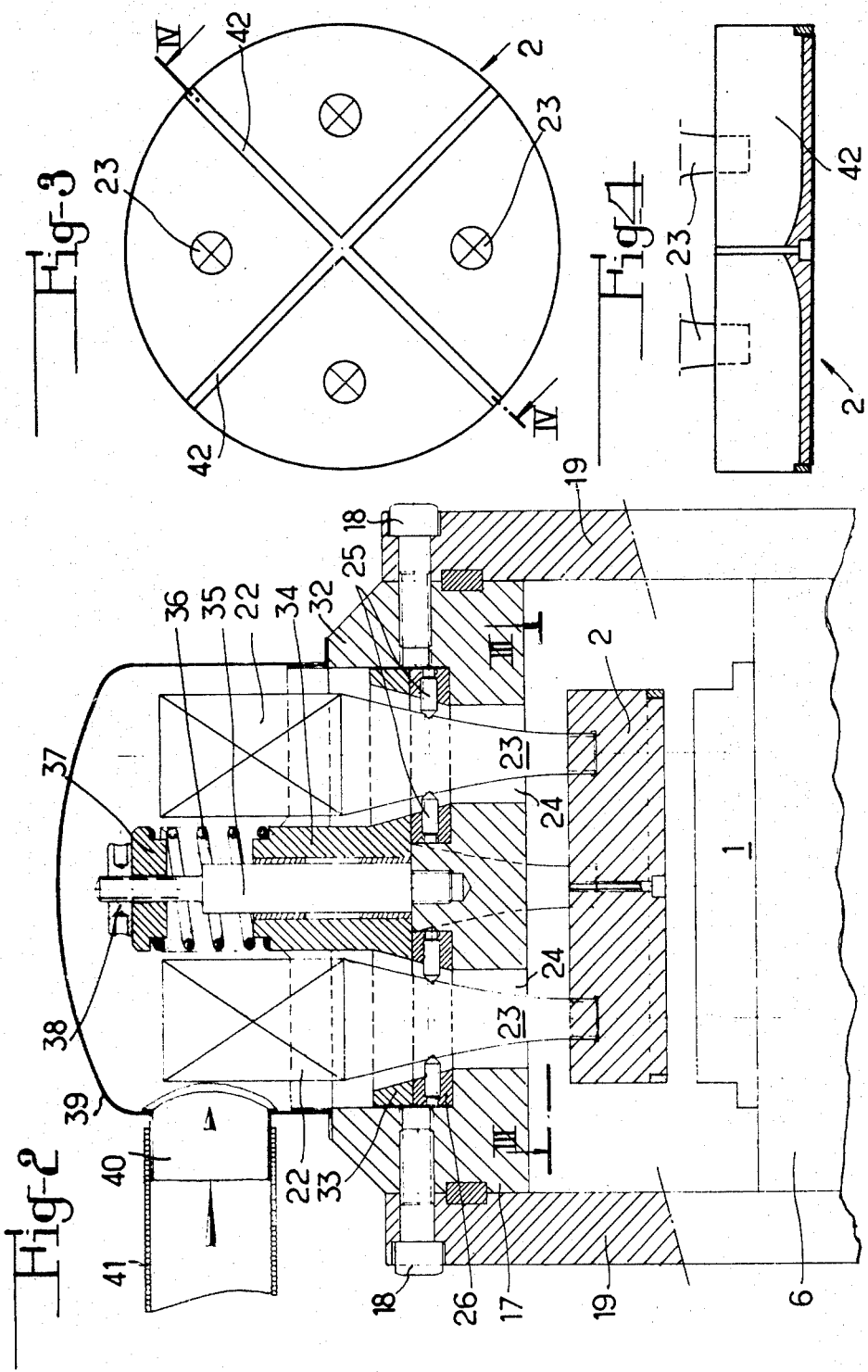

APPARATUS FOR PRESSING OBJECTS OUT OF THERMOPLASTIC MATERIAL, AND PARTICULARLY PHONOGRAPHIC DISKS

The present invention concerns a method and an apparatus for pressing objects out of thermoplastic material, particularly phonographic disks, wherein the previously heated material is compressed.

It is known that the manufacture of precision molded products, such as phonographic diSks, from thermoplastic material calls for a succession of delicate operations because of the elements comprising the production cycle, namely, the treatment of the material, pressing, steam, water for cooling, etc.

In spite of the improvements made during recent years in the special injection presses, the existing conditions at the moment of pressing are not always the same, which results in variations in the production and, consequently, a significant loss. In particular, no precise control can be exercised on the temperature of the material at the moment of pressing, so that one is generally obliged to lengthen uselessly the duration of the cycle, which obviously reduces the speed of production.

It is the principal purpose of the present invention to remedy this inconvenience and, in order to do this, it has for its object a pressing method of the above-mentioned type consisting in subjecting the material under pressure to a complementary regulated heating by means of high frequency vibration, notably ultrasonic, during a phase preceding the final pressing.

Thus, because of the use of ultrasonic or of another analogous vibratory means, such as hyperfrequencies, a very precise and extremely rapid heating can be obtained for the thermoplastic material and effected while the latter is under pressure. Further, the vibratory effect of the ultrasonic improves the formation of the impression, that is, in the case of disks, the penetration of the material into the grooves of the master or pattern. After having interrupted the ultrasonic vibration, the pressing is continued for a few moments, advantageously under high pressure, so as to overcome the vibratory effect. One proceeds next to congeal the molded piece by a sudden cooling which relieves the internal stresses.

The heating by ultrasonic vibration or by other high frequency vibrations having no inertia, in contrast to heating by steam, generally used until now, it is seen that with the procedure according to the invention, the speed of production can be considerably increased. Further, as the supply of heat can be controlled with great precision, the molding can still be completely effective taking into account the thermoplastic material used.

Preferably, the complementary heating is carried out with a pressure lower than 5 kg/cm², the final pressing being made with a pressure higher than 5 kg/cm².

It has been found, in fact, that pressures higher than 5 kg/cm² would overcome the vibratory effect of the ultrasonic device and, consequently, cut off the supply of heat as well as the advantages relating to the congealing of the molded article.

An apparatus for carrying out the process according to the invention comprises two disks disposed opposite to each other, each one bearing half of a pattern, and the first disk is shown as movable transversely in the direction toward the second disk. Said first disk is subjected to the reaction of a resiliently flexible means and said first disk is integral with at least one transmitter of high frequency vibrations. The second disk is provided with circulation channels for cooling fluid and is movable transversely by the actuating means capable of furnishing, at the proper time, the low pressure needed to balance the force exerted by the resiliently flexible means, during the functioning of the vibration transmitter, and the high pressure necessary for the final pressing of the material.

In one particular embodiment of the invention, the first plate is integral with several high frequency vibration transmitters and contains some radial grooves separating the different zones of effectiveness of these transmitters.

Two forms of carrying out the invention are described hereinafter by way of example, and by reference to the attached drawings, in which:

FIG. 1 is a partially sectioned view of a pressing or molding apparatus conforming to the invention;

FIG. 2 is a partially sectioned view of a modification for carrying out the invention, equipped with several ultrasonic transducers;

FIG. 3 is a sectional view taken along the line III—III of FIG. 2; and

FIG. 4 is a sectional view taken along the line IV—IV of FIG. 3.

The pressing apparatus disclosed in FIG. 1 is especially designed for the manufacture of phonographic disks, rigid or flexible, and comprises first of all two circular, horizontally disposed plates 1 and 2, which are disposed opposite each other, said plates carrying halves 3 and 4 of the pattern, respectively.

The lower plate 1 carrying the half 3 of the pattern is provided with circular channels 5 for a cooling fluid and it is affixed to a plate support 6 by the screws 7. It will be noted on the other hand that the plate 1 is equipped with a device 8 of a known type, arranged to form the central opening in the phonographic disk while it is being pressed.

The plate support 6 is attached in turn by the screws 9 to a piston 10, with a flexible joint 30 therebetween permitting the take-up of defects in the meeting faces of plates 1 and 2. The piston 10 is capable of sliding vertically in a cylindrical bore 11 provided in a base 12 by the force of a pressure fluid applied through an input orifice 13 furnished from a source of supply S, which inturn has a conventional control device C associated therewith for controlling the pressure of the fluid supplied to the bore 11. This piston 10 is surrounded with an annular liquid tight seal 14, maintained in place by a lock ring 15 which is secured to the body 12 by the screws 16.

The top plate 2, which carries the other half 4 of the pattern, is indirectly supported by a horizontal plate support 17 which is secured by the screws 18 to the upper parts of two side plates 19, which are affixed at their lower ends to the base 12 by the screws 20. On the plate support 17 is fixed by soldering a central sleeve 21 in the interior of which is disposed, according to the invention, a high frequency vibration transmitter, comprised here by an ultrasonic transducer 22 the lower part 23 of which passes through an opening 24 in the plate 17 and is integrally attached to the plate 2 by a threaded connection.

The transducer 22 is engaged by some pointed screws 25, furnishing support at the node of vibrations, which screws are mounted on a ring 26 susceptible to upward sliding movement within the interior of the sleeve 21. Furthermore, this transducer and plate 2, to which it is fixedly secured, are constantly urged toward the base 12 by a helical spring 27 engaged at its lower end by the sliding ring 26 and on the upper end by a ring 28 which is screwed within the upper end of the sleeve 21. This ring 28 is thus adjustable in height and permits, as a result, precise adjustment of the resilient force exerted by the spring 27. It will be noted moreover that this ring 28 furnishes a suitable opening to receive one of the extremities of a tube 29, designed to convey a cooling fluid, such as air, to the ultrasonic transducer 22.

The pressing apparatus which has been described functions in the following manner:

The thermoplastic material to be molded, which ought to be in the form of granules or in cut plastic film, undergoes the first step of heat preparation and is thereafter brought, by any known mechanical means or else by injection, between the patterns 3 and 4 carried by the plates 1 and 2. The ultrasonic transducer 22 is then excited by a high frequency current, delivered by a generator (not shown) simultaneously as the lower plate 1 is raised toward the upper plate 2 by means of piston 10.

When the patterns 3 and 4 come into contact with the plastic material therebetween, the upper plate 2 is pushed upwardly, to bring into effect the action of the spring 27, and then attains a position of equilibrium in which the downward force exerted by the spring 27 is in balance with the force exerted upwardly by the piston 10 on the lower plate 10. The thermoplastic material thus becomes subjected to a first pressure, which is relatively low and, moreover, can be adjusted by means of ring 28.

During this first phase of pressure, the ultrasonic movement of the transducer 22 causes the equalized heating of the pattern. It is understood, thus, that in adjusting the frequency and duration of the functioning of the transducer, one is able to effect a perfectly regulated complementary heating control of the material, and this with extreme precision. The pressing conditions are thus precisely determined and one can quickly complete the molding taking into account the characteristics the materials used. Furthermore, the vibratory effect of the ultrasonic device improves the setting of the impression by facilitating the penetration of the material into the bottom of the grooves of the pattern, where a phonographic disk is involved.

After a predetermined time of pressing, at low pressure, the functioning of the transducer 22 is terminated, and the pressing or molding is followed, for a short period of time, by a greater pressure in order to terminate the effect of the ultrasonic vibrations. In the course of this phase of high pressure, the upper plate 2 naturally comes to bear against plate support 17 under the force of piston 10 which is exerted now on the lower plate 1 by a strong corresponding pressure. Thereafter, a cooling fluid, such as water, is caused to flow in the circular grooves 5 of the plate 1 for congealing the molded object and removing all the internal stresses. Likewise, it is observed that, in the course of operation, the transducer 22 is cooled by a flow of air conveyed by the tube 29.

As the ultrasonic heat has no inertia, it is easily understood that the speed of production of such an apparatus of pressing can be very high, without any reduction in the quality of the molded objects. By way of example, it is only in the neighborhood of a few hundredths of a second to raise the temperature of the thermoplastic temperature to more than 100°C, at the same time being sufficient to bring all of it to a standard temperature.

It is observed, in addition, that pressures greater than 5 kg/cm$^2$ overcome the ultrasonic vibratory effect and, consequently, the application of heat. Consequently the plates carrying the pattern are subjected, during the first phase of pressing to a lower pressure than 5 kg/cm$^2$, a phase in the course of which a thermoplastic material will undergo a complementary heating controlled by the ultrasonic vibrations created by the transducer 22.

When the necessary temperature shall have been attained, the functioning of the transducer will be terminated while the pressing will be followed with a strong pressure in excess of 5 kg/cm$^2$, for example, in the order of 50 kg/cm$^2$. The means of supplying the fluid to the piston 10 will be understood to be such as to permit the application by the piston of the two different pressures required.

In the modified embodiment disclosed in the FIGS. 2 to 4, the upper plate 2 is equipped with several identical transducers 22, four in this example, of which the lower extremities 23 are uniformly disposed in a circle around this plate. In this mode of disclosure, the four transducers 22 are supported, as previously described, by means of pointed screws 25 on a ring 26 capable of being displaced upwardly in a hollow cylinder 32 defined within the plate support 17. This ring 26 is affixed to another ring 33 integral with a central sleeve 34, mounted for sliding on a vertical axle 35 integral with the plate support 17. The transducers 22 are urged toward the lower plate support 6 by a resilient spring 36 which is here disposed around the axle 35 and engaged at its lower end by the sleeve 34 and at its upper end by a ring 37 held on the upper threaded end of the axle 35 by the threaded locking collar 38. This locking collar 38 permits the adjustment of the highest position of the ring 37 and consequently the adjustment, as previously stated, to compensate for pressure exercised by the resilient spring 36 during the operation of the ultrasonic device.

The upper part of the apparatus is covered by a protective case 39 furnished with a lateral opening 40 forming an opening which is provided with an air tube 41 permitting the cooling of the transducer 22 in the course of its operation.

Conforming to a peculiarity of the invention, the upper plate 2 is divided into four sections by the radial grooves 42, as shown in the FIGS. 3 and 4, in order to separate clearly the different zones of influence of the four transducers 22 and to avoid useless interference.

It will be seen, moreover, that one can conceive of numerous modifications in details from the examples disclosed and described, without exceeding the scope of the invention.

We claim:

1. An apparatus for pressing an object, such as a phonographic disc, from thermoplastic material, said apparatus comprising:
   frame means;
   first plate means movably mounted on said frame means for rectilinear movement relative thereto along a first line of movement, said first plate means having a first pressing face thereon;

resilient means coacting between said frame means and said first plate means for normally resiliently urging said first plate means in a first direction for normally maintaining said first plate means in a predetermined position relative to said frame means;

said frame means including abutment means normally spaced from first plate means and disposed for engagement by said first plate means when same is moved away from the predetermined position in a second direction which is opposite said first direction;

high frequency vibrating means connected to said first plate means for permitting selected vibration thereof;

second plate means movably mounted on said frame means for rectilinear movement relative thereto and relative to said first plate means along a second line of movement which is substantially parallel to said first line of movement, said second plate means having a second pressing face thereon which is normally disposed opposite but spaced from said first pressing face;

fluid pressure cylinder means mounted on said frame means and coacting with said second plate means for moving same relative to said frame means toward said first plate means; and control means for supplying pressure fluid to said fluid cylinder means for causing linear movement of said second plate means toward and into engagement with said first plate means, whereby the opposed pressing faces are able to form an object therebetween, said control means initially supplying pressure fluid to said cylinder means at a first pressure level so that said second plate means moves into engagement with said first plate means and moves same away from said predetermined position in opposition to the urging of said resilient means so that the forces exerted on the first and second plate means by the cylinder means and the resilient means are substantially equalized, said control means then supplying pressure fluid to said cylinder means at a second pressure level which is substantially greater than said first pressure level for causing further displacement of said second plate means toward said first plate means for causing said first plate means to be moved into engagement with said abutment means for causing pressing of the material contained between the opposed pressing faces.

2. An apparatus according to claim 1, wherein said vibrating means comprises an ultra-sonic transducer having a portion thereof fixedly connected to said first plate means for causing high frequency vibration thereof when the first and second plate means are in engagement with another due to the presence of pressure fluid at said first pressure level within said cylinder means, said high frequency vibration causing heating of the material disposed between the opposed pressing faces.

3. An apparatus according to claim 2, wherein said vibrating means further includes a support member slidably supported on said frame means and having means fixedly mounted thereon and disposed in supporting engagement with said transducer at the node of vibration thereof, and said resilient means comprising spring means coacting between said frame means and said support member for urging said support member into abuting engagement with a stop surface formed on said frame means whereby said first plate means is normally maintained in said predetermined position.

4. An apparatus according to claim 2, wherein said transducer is substantially aligned with the central longitudinally extending axis of said first plate means and is fixedly connected to said first plate means substantially at the midpoint thereof, and said resilient means including a spring member disposed in surrounding relationship to said transducer.

5. An apparatus according to claim 2, wherein said vibrating means includes a plurality of substantially identical transducers disposed substantially parallel to one another and having one end of each fixedly connected to said first plate means, said plurality of transducers being disposed within a circular pattern generated substantially about the central longitudinally extending axis of said first plate means.

6. An apparatus according to claim 5, wherein said first plate means has a plurality of radially extending grooves formed therein for separating said first plate means into a plurality of different zones, each of said zones having a different one of said transducers connected thereto.

7. An apparatus according to claim 1, wherein each of said pressing faces has pattern means formed thereon defining one side of a phonographic disc.

8. An apparatus according to claim 7, wherein said second plate means has passage means formed therein for permitting circulation of a cooling fluid therethrough.

* * * * *

UNITED STATES PATENT OFFICE
CERTIFICATE OF CORRECTION

Patent No. 3,752,620  Dated August 14, 1973

Inventor(s) Robert A. Renoux

It is certified that error appears in the above-identified patent and that said Letters Patent are hereby corrected as shown below:

Foreign Application Priority Data

Oct. 20, 1970  France..................70.37736

Column 5, line 10, after "from", insert -- said --.

Signed and sealed this 7th day of May 1974.

(SEAL)
Attest:

EDWARD M. FLETCHER, JR.
Attesting Officer

C. MARSHALL DANN
Commissioner of Patents